UNITED STATES PATENT OFFICE.

JOHN J. WEST, OF CHICAGO, ILLINOIS.

PROCESS OF PREPARING OR TREATING COMPOSITION OR MATERIAL TO BE USED IN MAKING PLAQUES.

SPECIFICATION forming part of Letters Patent No. 297,206, dated April 22, 1884.

Application filed October 24, 1883. (Specimens.)

*To all whom it may concern:*

Be it known that I, JOHN J. WEST, of Chicago, in the county of Cook and State of Illinois, have invented certain new and useful improvements in the art or process of preparing or treating composition or material to be used in making vases, plaques, and other articles intended for decoration in oil- colors, of which the following is a specification.

In making or preparing the composition or substance I proceed as follows: I make a mixture of plaster-of-paris, Venetian red or other equivalent mineral earth, and water, which mixture I cast in a glue mold, as usual in casting plaster-of-paris goods. I use, by weight, about one part of Venetian red or other mineral earth and about nineteen parts of plaster-of-paris; but these proportions may be varied, if desired, it being understood that enough water is also used to make a fluid mixture for casting. The cast, when made, is dried, and afterward coated with oil-varnish—such as furniture or coach varnish—which may be used plain; but I prefer to dilute it with linseed-oil or oil of turpentine, or both. I next allow the coating so applied to become dry and absorbed by the plaster-of-paris and mineral earth, after which I apply one or more coats of paint made of white zinc ground in oil (preferably poppy-oil) and diluted with turpentine or turpentine and linseed-oil. This paint may be either tinted or not, as may be preferred, and is allowed to become dry, when the cast is in condition for being decorated in oil-colors. The oil-varnish penetrates into and is absorbed by the composition to which it is applied, and dries slowly and gradually, and forms not merely a coating of varnish, but a durable hard body permeating the composition to some extent, or becoming incorporated therewith, and thereby being prevented from scaling, checking, or peeling off after the article has been painted in oil or artistically decorated. A smooth and even surface is thus obtained, which harmonizes with and has an affinity for the turpentine and oil-paint, all being intimately associated or incorporated, so as to prevent the paint applied in decorating from blistering, flaking, or chipping off, and the oil-colors are also prevented from penetrating or becoming absorbed by the material of which the cast is made.

Having thus described my invention, what I claim as new, and desire to secure by Letters Patent, is—

1. In the manufacture of casts for decoration in oil-colors, the process of preventing the checking, cracking, or peeling off of the oil-paint applied for decoration, which process consists in applying to the dry cast a coating of oil-varnish, substantially as and for the purposes specified.

2. In the manufacture of casts for decoration in oil-colors, the process of preventing the checking, cracking, or peeling off of the oil-paint applied for decoration, which process consists in applying to the dry cast a coating of oil-varnish, allowing the said coating to become dry, and then painting the same with white zinc ground in oil, substantially as and for the purposes specified.

3. A composition for the manufacture of casts for decoration in oil-colors, which composition consists of an absorbent material coated in its hard and dry state with oil-varnish, and afterward painted with white zinc ground in oil, substantially as and for the purposes specified.

4. A cast made from absorbent material brushed in its hard and dry state with oil-varnish, and afterward painted with white zinc ground in oil, substantially as and for the purposes specified.

In testimony that I claim the foregoing as my own I hereto affix my signature in presence of two witnesses.

JOHN J. WEST.

Witnesses:
F. F. WARNER,
J. B. HALPENNY.